(12) United States Patent
Fuhse et al.

(10) Patent No.: US 10,105,982 B2
(45) Date of Patent: Oct. 23, 2018

(54) SECURITY ELEMENT HAVING A LENTICULAR IMAGE

(71) Applicant: GIESECKE & DEVRIENT GMBH, München (DE)

(72) Inventors: Christian Fuhse, Otterfing (DE); Michael Rahm, Bad Tölz (DE); André Gregarek, München (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 28 days.

(21) Appl. No.: 15/129,235

(22) PCT Filed: Mar. 31, 2015

(86) PCT No.: PCT/EP2015/000699
§ 371 (c)(1),
(2) Date: Sep. 26, 2016

(87) PCT Pub. No.: WO2015/149939
PCT Pub. Date: Oct. 8, 2015

(65) Prior Publication Data
US 2017/0106689 A1    Apr. 20, 2017

(30) Foreign Application Priority Data
Mar. 31, 2014  (DE) .................. 10 2014 004 700

(51) Int. Cl.
*B42D 25/00*  (2014.01)
*B42D 25/324*  (2014.01)
(Continued)

(52) U.S. Cl.
CPC ........... *B42D 25/328* (2014.10); *B42D 25/00* (2014.10); *B42D 25/21* (2014.10); *B42D 25/23* (2014.10);
(Continued)

(58) Field of Classification Search
CPC ..... B42D 25/41; B42D 25/435; B42D 25/324
See application file for complete search history.

(56) References Cited

U.S. PATENT DOCUMENTS 4,765,656 A * 8/1988 Becker .................. B42D 25/00
283/91
7,333,268 B2  2/2008 Steenblik et al.
(Continued)

FOREIGN PATENT DOCUMENTS

AU  2013248632 A1  11/2014
CN  102712205 A  10/2012
(Continued)

OTHER PUBLICATIONS

German Search Report for corresponding German Application No. 102014004700.8, dated Jul. 29, 2014.
(Continued)

*Primary Examiner* — Kyle R Grabowski
(74) *Attorney, Agent, or Firm* — Workman Nydegger

(57) ABSTRACT

A security element for securing security papers, value documents and other data carriers, has a lenticular image that, from different viewing directions, displays at least two appearances. The lenticular image includes a lens grid composed of a plurality of microlenses and a laser-sensitive motif layer arranged spaced apart from the lens grid. The laser-sensitive motif layer comprises, in two or more motif layer sub-regions, different markings introduced by the action of laser radiation and that, when the motif layer is viewed with the lens grid, produce at least two appearances. The lens grid is divided into two or more lens grid sub-regions in which the microlenses each comprise differently refractive lens surface forms. The different lens grid sub-regions are congruent with the different motif layer sub-regions, and the markings of the motif layer sub-regions
(Continued)

being produced by laser impingement of the lens grid sub-regions.

17 Claims, 5 Drawing Sheets

(51) Int. Cl.
*B42D 25/328* (2014.01)
*B42D 25/23* (2014.01)
*B42D 25/29* (2014.01)
*B42D 25/21* (2014.01)
*B42D 25/435* (2014.01)
*B42D 25/351* (2014.01)
*B42D 25/355* (2014.01)
*G02B 3/00* (2006.01)

(52) U.S. Cl.
CPC ........... *B42D 25/29* (2014.10); *B42D 25/324* (2014.10); *B42D 25/351* (2014.10); *B42D 25/355* (2014.10); *B42D 25/435* (2014.10); *G02B 3/005* (2013.01); *G02B 3/0043* (2013.01)

(56) References Cited

U.S. PATENT DOCUMENTS

| | | | |
|---|---|---|---|
| 8,009,360 B2 | 8/2011 | Steenblik et al. | |
| 8,077,393 B2 | 12/2011 | Steenblik et al. | |
| 8,111,462 B2 | 2/2012 | Steenblik et al. | |
| 8,120,855 B2 | 2/2012 | Steenblik et al. | |
| 8,254,030 B2 | 8/2012 | Steenblik et al. | |
| 8,310,760 B2 | 11/2012 | Steenblik et al. | |
| 8,867,134 B2 | 10/2014 | Steenblik et al. | |
| 9,429,762 B2 | 8/2016 | Holmes et al. | |
| 2005/0180020 A1* | 8/2005 | Steenblik | B42D 25/00 359/626 |
| 2008/0036196 A1 | 2/2008 | Steenblik et al. | |
| 2008/0165423 A1 | 7/2008 | Steenblik et al. | |
| 2008/0212192 A1 | 9/2008 | Steenblik et al. | |
| 2008/0212193 A1 | 9/2008 | Steenblik et al. | |
| 2008/0239500 A1* | 10/2008 | Niemuth | B29D 11/00278 359/619 |
| 2008/0309063 A1* | 12/2008 | Zintzmeyer | B42D 25/29 283/72 |
| 2009/0021840 A1 | 1/2009 | Steenblik et al. | |
| 2009/0310470 A1* | 12/2009 | Yrjonen | B42D 25/00 369/116 |
| 2010/0308571 A1 | 12/2010 | Steenblik et al. | |
| 2011/0209328 A1 | 9/2011 | Steenblik et al. | |
| 2012/0098249 A1* | 4/2012 | Rahm | B42D 25/21 283/85 |
| 2012/0194916 A1* | 8/2012 | Cape | B42D 25/29 359/620 |
| 2012/0268598 A1 | 10/2012 | Holmes et al. | |
| 2013/0270813 A1 | 10/2013 | Hoffmuller et al. | |
| 2015/0146297 A1* | 5/2015 | Commander | B42D 25/21 359/627 |
| 2016/0101643 A1* | 4/2016 | Cape | B42D 25/324 359/627 |

FOREIGN PATENT DOCUMENTS

| | | |
|---|---|---|
| CN | 103097919 A | 5/2013 |
| DE | 202004021712 U1 | 7/2010 |
| DE | 102009037236 A1 | 2/2011 |
| DE | 102010048772 A1 | 4/2012 |
| DE | 102012007747 A1 | 10/2013 |
| DE | 102012211077 A1 | 1/2014 |
| WO | 2012084211 A1 | 6/2012 |

OTHER PUBLICATIONS

International Search Report for corresponding International PCT Application No. PCT/EP2015/000699, dated Sep. 8, 2015.
Chinese Search Report from CN Application No. 201580015847X, dated Apr. 24, 2017.

* cited by examiner

SECURITY ELEMENT HAVING A LENTICULAR IMAGE

BACKGROUND

The present invention relates to a security element, for securing security papers, value documents and other data carriers, having a lenticular image that displays, from different viewing directions, at least two different appearances. The lenticular image includes a lens grid, composed of a plurality of microlenses, and a laser-sensitive motif layer that is arranged spaced apart from the lens grid, and the laser-sensitive motif layer comprises, in two or more motif layer sub-regions, different markings that are introduced by the action of laser radiation and that, when the motif layer is viewed with the lens grid, produce the at least two different appearances. The present invention also relates to a method for manufacturing such a security element, and a data carrier that is equipped with such a security element.

For protection, data carriers, such as value or identification documents, but also other valuable articles, such as branded articles, are often provided with security elements that permit the authenticity of the data carrier to be verified, and that simultaneously serve as protection against unauthorized reproduction.

Security elements having viewing-angle-dependent effects play a special role in safeguarding authenticity, as these cannot be reproduced even with the most modern copiers. Here, the security elements are furnished with optically variable elements that, from different viewing angles, convey to the viewer a different image impression and, depending on the viewing angle, display for example another color or brightness impression and/or another graphic motif.

In this connection, it is known to provide the data carriers with laser-engraved tilt images for safeguarding. Here, two or more different markings, for example a serial number and an expiration date, are laser-engraved in the data carrier at different angles through an arrangement of cylindrical lenses. The laser radiation here produces a local blackening of the card body, which makes the engraved markings visually visible. When viewed, depending on the viewing angle, only the respective marking engraved from that direction is visible such that, by tilting the card vertically to the axis of the cylindrical lenses, an optically variable tilt effect is created.

In addition to tilt images, also other security elements are known in the background art that present to a viewer direction-dependently different depictions in that corresponding micro-image elements are enlarged with the aid of microlenses, for example so-called moiré magnification arrangements and other micro-optical depiction arrangements.

In all of these security elements, the structuring of the micro-images is often technically more challenging than the structuring of the lenses, since a significantly higher resolution is required for the micro-images, especially since the image information for at least two views must be provided under each lens. Further, the line screens of the lenses and micro-images must match each other very precisely, since otherwise, in tilt images, for example, multiple views will be visible simultaneously, or in moiré magnification arrangements, image distortions can occur.

It is known to produce micro-images by means of printing methods, embossing methods, or by overlaying the images through the microlenses by means of a laser. Here, advantage is taken of the fact that an incident laser beam is focused by the microlenses, as a result of which, on the one hand, the required high resolution can be achieved, and on the other hand, the inscribed information is later visible also from the direction from which it was overlaid with the laser beam.

If one would like to implement such an overlaying by laser on an industrial scale, especially on a foil web in a roll-to-roll process, then numerous micro-images must be overlaid very quickly with very powerful lasers. Here, the laser beam is permitted to impinge on the foil having the lenses only at those sites at which, in the depiction produced, the image is later to be produced, so for example at which a metal layer is to be ablated. For this purpose, the laser beam can be scanned over the lens foil accordingly such that only the desired motif region is impinged on. Alternatively, the motif region can be defined with a mask that prevents, in some regions, the exposure of the underlying lenses.

In practice, however, both methods are quite complex. Suitable scanning devices are expensive and often do not achieve the speeds required in an industrial production line. In a roll-to-roll process, a mask should preferably move at the speed of the foil web, and moreover, a separate mask is needed for each view such that, in practice, the mask cannot simply be printed on the foil web. Alternatively, a separate printing step must be carried out for each view, the printing mask having to be removed after laser exposure from the appropriate direction.

SUMMARY

Proceeding from this, it is the object of the present invention to specify a security element of the kind cited above in which the markings can be introduced into the motif layer easily by laser impingement.

According to the present invention, in a generic security element, it is provided that
- the lens grid is divided into two or more lens grid sub-regions in which the microlenses each comprise differently refractive lens surface forms,
- the different lens grid sub-regions being congruent with the different motif layer sub-regions, and the markings of the motif layer sub-regions being produced by laser impingement of the lens grid sub-regions.

Here, the present invention is based on the idea of already encoding the desired markings of the motif layer in the lens grid through the use of microlenses having different lens surface forms such that, upon a large-scale laser impingement of the lens grid from the desired viewing directions, the desired markings are produced in the motif layer without a mask or a scanning of the motif layer with a fine laser beam being required.

In conventional designs, in scanning the lens foil, the laser beam is permitted to be, at most, as large as the smallest structure to be produced in the motif layer. In contrast, the laser impingement in the context of the present invention can occur in a large area and strike multiple, normally multiple tens or even multiple hundreds of, microlenses simultaneously. The lens grid can be scanned, for example, with a coarse laser beam, with no registration needing to be observed, or the lens grid can even be impinged on contiguously with laser radiation. The production of the markings can thus occur significantly faster, and also the equipment outlay is lower, since also a precise positioning of the laser beam can be dispensed with.

The requirement that the lenticular image display at least two different appearances is advantageously realized in that the lenticular image displays at least two different representational views between which it is possible to alternate by tilting the security element back and forth. However, it is also possible that the lenticular image includes only a single representational depiction that is visible from some viewing directions but not from other viewing directions. Also in this way, two different appearances are defined, namely the first appearance, in which the representational depiction is present, and the second appearance, in which the representational depiction is lacking.

In one advantageous embodiment, the microlenses are divided into two or more lens segments, the lens surfaces of the lens segments within a lens grid sub-region being developed to be identical but, independently of each other, focusing or non-focusing. In other words, in a certain lens grid sub-region, the lens surfaces of the lens segments are each developed to be identical for all microlenses, it being possible, however, to define for each lens segment, independently of the other lens segments, whether it is developed to be focusing or non-focusing in said lens grid sub-region.

Advantageously, the lens surface is developed to be convex in the focusing lens segments and concave in the non-focusing segments, the radius of curvature in the focusing and the non-focusing segments particularly advantageously being identical in terms of absolute value. In principle, however, the non-focusing lens segments can also be developed to be flat. A further possibility for the design of the non-focusing segments consists in providing a convex and thus fundamentally focusing design with a strongly scattering superstructure, through which the incident light is scattered so strongly in different directions that the focusing effect of the convex lens surface is canceled. The strongly scattering superstructure can be formed, for example, by embossed roughnesses or irregularities having dimensions greater than the wavelength of visible light, for example having dimensions of a few micrometers. Also with other forms of the lens surface, a non-focusing effect can be achieved or further enhanced through such superstructures.

The microlenses can comprise a circular or polygonally delimited base surface, or be formed by elongated cylindrical lenses (rod lenses). The development of the microlenses as Fresnel lenses is also possible. The microlenses can be arranged in a one- or two-dimensional grid.

In preferred embodiments, the lens grid is formed from a plurality of parallel rod lenses. In one advantageous design, the rod lenses are each divided into two or more lens segments that extend longitudinally and in which the lens surfaces within a lens grid sub-region are developed to be identical but, independently of each other, focusing or non-focusing, especially beam expanding.

The rod lenses can also advantageously be divided into exactly two, left and right, lens segments that extend longitudinally and in which the lens surfaces within a lens grid sub-region are developed to be identical but, independently of each other, focusing or non-focusing, especially beam expanding, there being at least one lens grid sub-region in which the left lens segment of the rod lenses is developed to be focusing and the right lens segment of the rod lenses non-focusing, and there being at least one lens grid sub-region in which the left lens segment of the rod lenses is developed to be non-focusing and the right lens segment of the rod lenses focusing.

Advantageously, there is additionally at least one lens grid sub-region in which the left and the right lens segment of the rod lenses are developed to be focusing, and/or at least one lens grid sub-region in which the left and the right lens segment of the rod lenses are developed to be non-focusing.

In some designs, it can be advantageous if the focal points of different focusing lens segments of the same microlenses are offset from each other in the motif plane. Here, through suitable coordination of the offset distance and direction of incidence of the laser radiation, a particularly large proportion of the incident radiation can be directed to the focus by the focusing lens segments. Accordingly, in the non-focusing lens segments, a particularly large proportion of the incident radiation does not contribute to modification. In this way, the selection of a suitable laser power for the selective modification is simplified and particularly high-contrast depictions can be produced. The offset distance can be chosen within a broad range, care must be taken only that the offset of the focal points does not lead to the same sites below the lenses being in the focus when viewed from the left or the right.

The present invention also includes a method for manufacturing a security element of the kind mentioned having a lenticular image that, from specified different viewing directions, displays at least two different appearances, and in the method, a lens grid consisting of a plurality of microlenses being produced that is divided into two or more lens grid sub-regions in which the microlenses are each produced having differently refractive lens surface forms, the lens grid being arranged spaced apart over a laser-sensitive motif layer, and the lens grid being impinged on in each case in a large area with laser radiation from the specified different viewing directions to produce in the laser-sensitive motif layer two or more motif layer sub-regions that are congruent with the different lens grid sub-regions and that have different markings that are introduced by the action of laser radiation and that, when the motif layer is viewed with the lens grid, produce the at least two different appearances.

In one advantageous procedure, the lens grid is formed from a plurality of parallel rod lenses, the rod lenses particularly preferably each being divided into two or more lens segments that extend longitudinally, and the lens surfaces of the lens segments within a lens grid sub-region being developed to be identical but, independently of each other, focusing or non-focusing, especially beam expanding.

The present invention also includes a data carrier, especially a value document, a security paper, an identification card, a branded article or the like, having a security element of the kind described.

Further exemplary embodiments and advantages of the present invention are explained below by reference to the drawings, in which a depiction to scale and proportion was dispensed with in order to improve their clarity.

BRIEF DESCRIPTION OF THE DRAWINGS

Shown are.

DETAILED DESCRIPTION OF VARIOUS EMBODIMENTS

Figure 1:
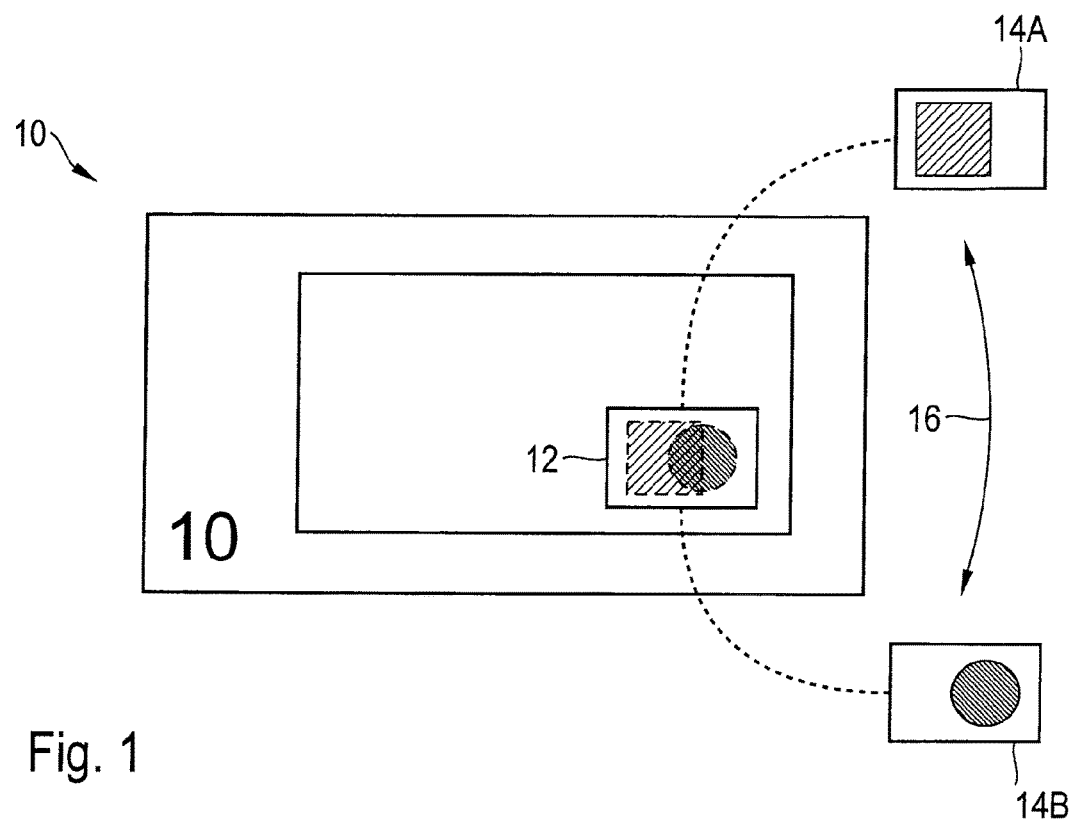
FIG. 1 in a schematic depiction, a banknote having an inventive security element that includes a tilt image having two different appearances, FIG. 2 schematically, a security element according to the present invention in cross section to explain the fundamental approach in producing markings by means of laser impingement, FIGS. 3a and 3b in cross section, a section of a security element according to an exemplary embodiment of the present invention, (a) and (b) illustrating the effect of a laser impingement from the left and the right, respectively, on the motif layer, FIG. 4 schematically, four lens types of a lens grid having different lens surface forms and the associated modifications of the motif layer, FIG. 5 a top view of the lens grid of the security element in FIG. 1, FIGS. 6a and 6b in (a) and (b), a top view only of the motif layer of the security element in FIG. 1 after two intermediate steps in the manufacture of the security element, FIG. 7 schematically, the design of a acute lens having two focal points that are offset from each other in the motif layer, and FIG. 8 a sub-region of an inventive security element having a lens grid having acute lenses according to FIG. 7.

The invention will now be explained using the example of security elements for banknotes and other value documents. For this, FIG. 1 shows a schematic diagram of a banknote 10 that is furnished with an inventive security element 12 in the form of an affixed transfer element. The security element 12 constitutes, in the exemplary embodiment, a tilt image that, depending on the viewing direction, displays one of two different appearances 14A, 14B.

However, the present invention is not in any way limited to the transfer elements in banknotes used for illustration, but can, for example, also be used in security threads, wide security strips or in cover foils that are arranged over an opaque region, a window region or a through opening in a document.

For illustration, the appearances are formed in the exemplary embodiment by a square 14A or a circle 14B, but in practice usually constitute more complex motifs, for example the denomination of the banknote, geometric patterns, portraits, codes, numberings, architectural, technical or nature motifs. Upon tilting 16 the banknote 10 or a corresponding change in the viewing direction, the appearance of the security element 12 alternates back and forth between the two appearances 14A, 14B.

While lenticular images having tilt images are known as such, the present invention provides a specially developed lenticular image in which the markings that, when viewed, produce the desired appearances 14A, 14B, are introduced into the motif layer of the lenticular image particularly easily by laser impingement. In particular, for overlaying by means of laser, neither a mask nor a fine scanning of the motif layer with a sharply focused or finely focused laser beam is necessary.

Figure 2:
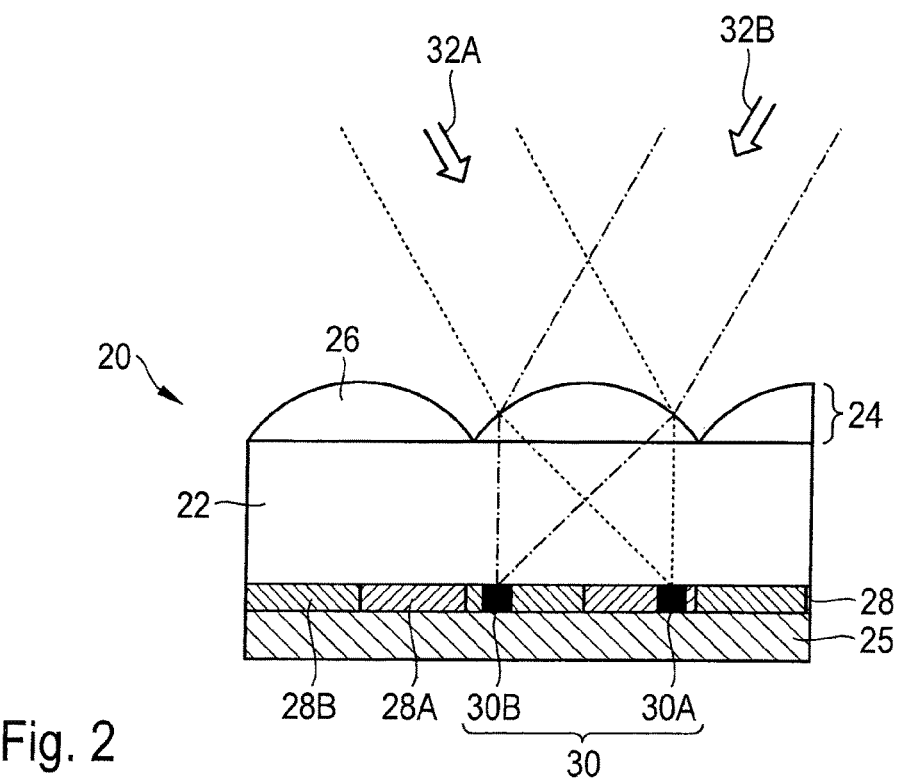

To aid in understanding the present invention, first the fundamental approach when producing markings by means of laser impingement is explained with reference to FIG. 2. The drawing shows, schematically, a security element 20 in cross section, with, as also in the subsequent drawings, only those portions of the structure being depicted that are required for the explanation of the basic principle. The security element 20 includes a substrate 22 in the form of a transparent plastic foil, for example a polyethylene terephthalate (PET) foil about 20 µm thick. The substrate 22 comprises opposing first and second main surfaces, the first main surface being provided with a lens grid 24 composed of a plurality of substantially cylindrical rod lenses 26.

Here, the thickness of the substrate 22 and the curvature of the focusing lens surfaces of the rod lenses 26 are coordinated with each other in such a way that the focal length of the rod lenses 26 substantially corresponds to the thickness of the substrate 22. The laser-sensitive motif layer 28 arranged on the second, opposite main surface of the substrate 22 then lies in the focal plane of the rod lenses 26. The security element 20 typically includes further layers 25, such as protective, cover or additional functional layers, which, however, are not significant for the present invention and are thus not described in greater detail.

When overlaying the markings 30, advantage is now taken of the fact that an incident laser beam 32A, 32B is focused by the rod lenses 26 and, in this way, can produce in the focal plane a local modification 30A, 30B of the laser-sensitive motif layer. Said modification can consist, for example, in the local ablation of a thin metal layer or in a coloring, especially a blackening, of a laser-sensitive material.

When producing a tilt image having two views 14A, 14B, the rod lenses 26 are impinged on from two different directions with laser radiation 32A, 32B. A laser beam 32A incident from the left in the depiction in FIG. 2 then produces a local modification 30A in the right portion 28A of the motif layer region lying below the rod lenses. Accordingly, a laser beam 32B incident from the right in the depiction in FIG. 2 produces a local modification 30B in the left portion 28B of the motif layer region lying below the rod lenses. The entirety of the modifications 30A or 30B form the markings 30 in the motif layer 28 that, when viewed with the lens grid from the corresponding viewing directions, produce the two different appearances 14A (entirety of the modifications 30A) and 14B (entirety of the modifications 30B).

Through said approach, on the one hand, a very high resolution of the markings to be produced is achieved, and on the other hand, due to the reversibility of the beam path, it is ensured that, when viewed subsequently, the inscribed information is visible from the same direction from which it was overlaid with the laser beam 32A, 32B. However, to produce the desired views 14A, 14B, it must also be ensured that the focused laser radiation strikes in each case only the motif layer 28 regions to be modified. In the background art, this is achieved either in that the lenses 26 are scanned with a narrow laser beam in the shape of the markings to be produced, or in that a mask in the shape of the markings to be produced is used that prevents, in some regions, an exposure of the underlying lenses and thus of the motif layer.

The present invention provides another way here, in which, to produce the markings, the lens grid can be impinged on with laser radiation in a large area and without using a mask. Here, especially asymmetric rod lenses are used, whose lens surface focuses on the motif layer plane only laser radiation that is incident from certain directions.

Figure 3A:
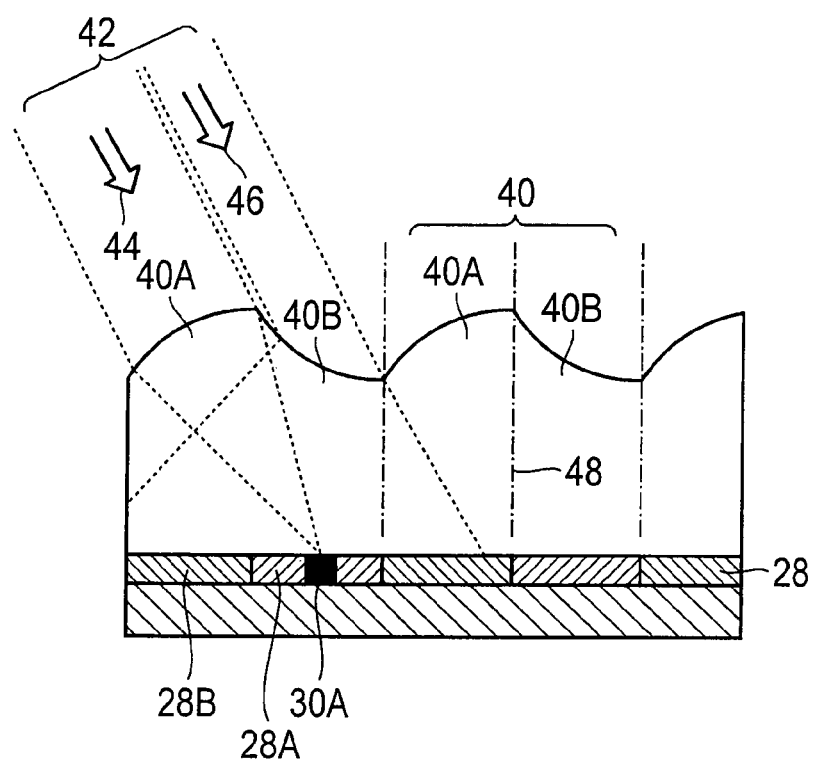

To explain in greater detail, FIG. 3(a) first shows, in cross section, a section of a security element having a lens grid composed of rod lenses 40 that are divided along their centerline 48 into two lens segments 40A, 40B of identical size. Here, the lens surface of the lens segment 40A is, like the rod lenses 26 in FIG. 2, developed to be convex and thus focusing, while the lens surface of the lens segment 40B is developed to be concave and thus beam expanding.

A laser beam 42 that, in the depiction in FIG. 3(a), is incident from the left is then focused for the most part 44 by the lens segment 40A on the motif layer 28 and, due to the high energy density, produces a local modification 30A in the right portion 28A of the motif layer region lying below the rod lens 40. A smaller portion 46 of the incident laser beam 42 is scattered by the lens segment 40B and, due to the resulting low energy density, does not contribute to the modification of the motif layer 28.

Due to the asymmetry of the rod lenses 40, the effect of a laser beam 52 that is incident from the right is not mirror symmetric. From a laser beam 52, incident from the right in the depiction in FIG. 3(*b*), only a small portion 54 strikes the focusing lens segment 40A, while the predominant portion 56 of the incident radiation is scattered by the beam expanding lens segment 40B.

Since the power density in the focus region 30C upon laser impingement from the right (FIG. 3(*b*)) is thus lower than in the focus region 30A of the laser impingement from the left (FIG. 3(*a*)), it can be achieved through suitable setting of the laser power that the modification threshold of the motif layer 28 is exceeded only upon impingement from the left, while upon impingement from the right, the power density in the focus 30C of the lens segments 40A remains below the modification threshold of the motif layer 28 such that, upon impingement from the right through the lenses 40, no information is inscribed in the motif layer 28.

Figure 3B:
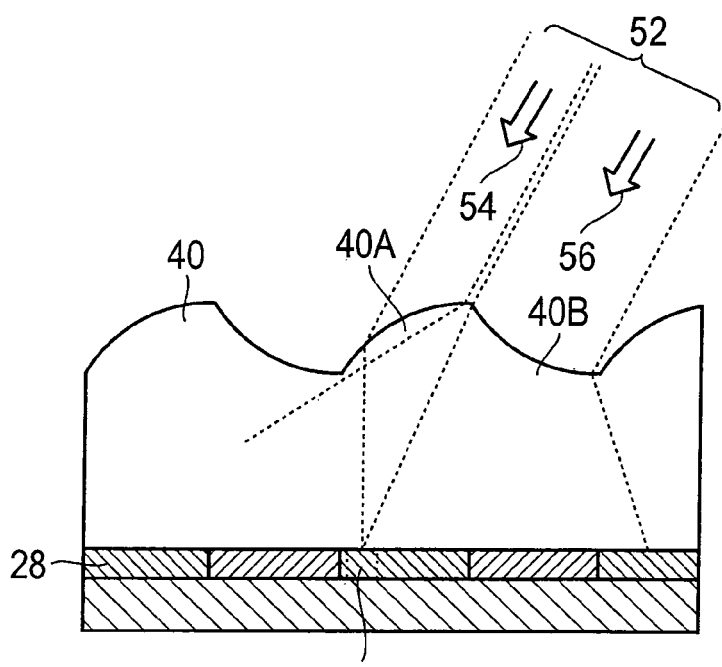
Figure 4:
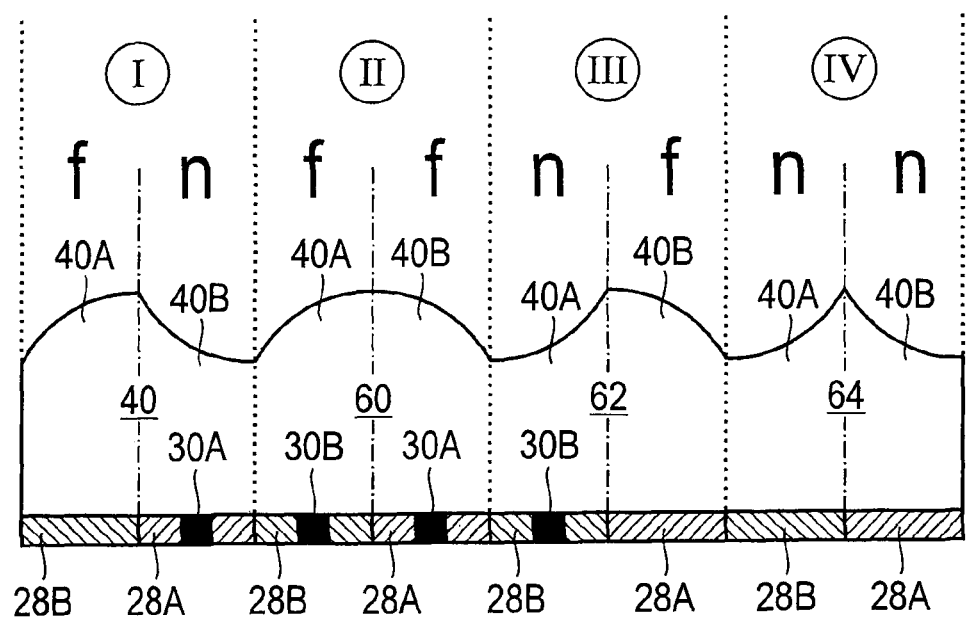

As depicted, again schematically, in FIG. 4, with rod lenses 40 of the kind shown in FIG. 3, only the right regions 28A are provided with local modifications 30A despite laser impingement from the left and from the right. For this purpose, the lens segment 40A is developed to be focusing (f), while the lens surface of the lens segment 40B has a non-focusing (n), here even beam-expanding, effect. Lenses having said lens surface form are referred to below as lens type I.

Conventional rod lenses 60 in which both lens segments 40A, 40B are developed to be focusing (f) are referred to as lens type II. With rod lenses of type II, both the right regions 28A and the left regions 28B are provided with local modifications 30A and 30B upon laser impingement from the left and from the right, as already explained in connection with FIG. 2.

Rod lenses 62 of lens type III are developed to be mirror-inverted to the rod lenses 40 of type I, that is, the lens segment 40A is developed to be non-focusing (n), while the lens surface of the lens segment 40B has a focusing (f) effect. With these lenses, only the left regions 28B are provided with local modifications 30B despite laser impingement from the left and from the right.

Finally, the rod lenses 64 of lens type IV are composed of two non-focusing (n) lens segments 40A, 40B. Despite laser impingement from the left and from the right, with said lenses, no local modifications are produced in the motif layer 28.

Figure 5:
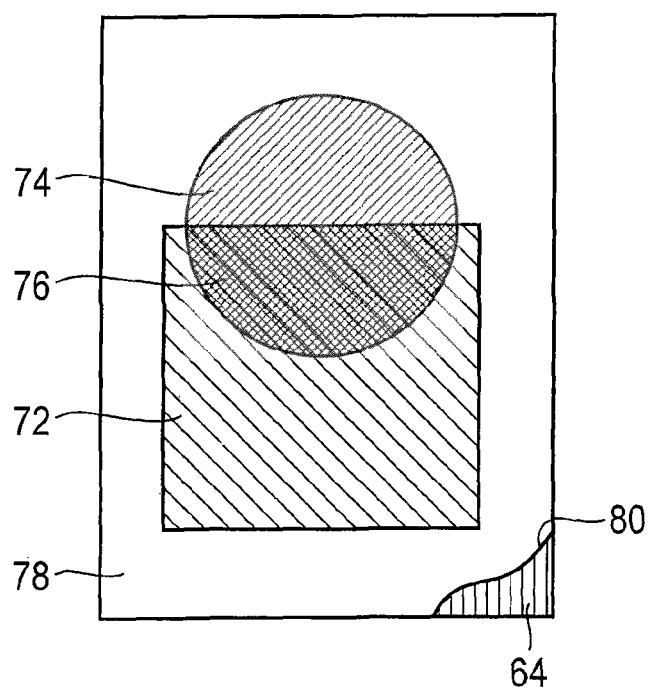

With said four lens types, the lens grid of the security element 12 can now be developed in such a way that the desired markings can each be overlaid by a contiguous laser impingement from the left and from the right. With reference to the top view of the lens grid 70 in FIG. 5, whose orientation is rotated by 90° with respect to the depiction in FIG. 1, rod lenses of type I are provided in the lens grid sub-region 72 (wide hatching), rod lenses of type III in the lens grid sub-region 74 (narrow hatching), rod lenses of type II in the lens grid sub-region 76 (crosshatching), and rod lenses of type IV in the lens grid sub-region 78 (no hatching). For illustration, in the region 80 in the lower right corner of the security element 12, the orientation of the rod lenses 64 of the sub-region 78 is drawn in. The rod lenses 40, 60 and 62 of the other lens grid sub-regions have the same orientation and differ only in the form of the lens surface (ff, fn or of instead of nn) of the rod lenses 64.

Figure 6A:
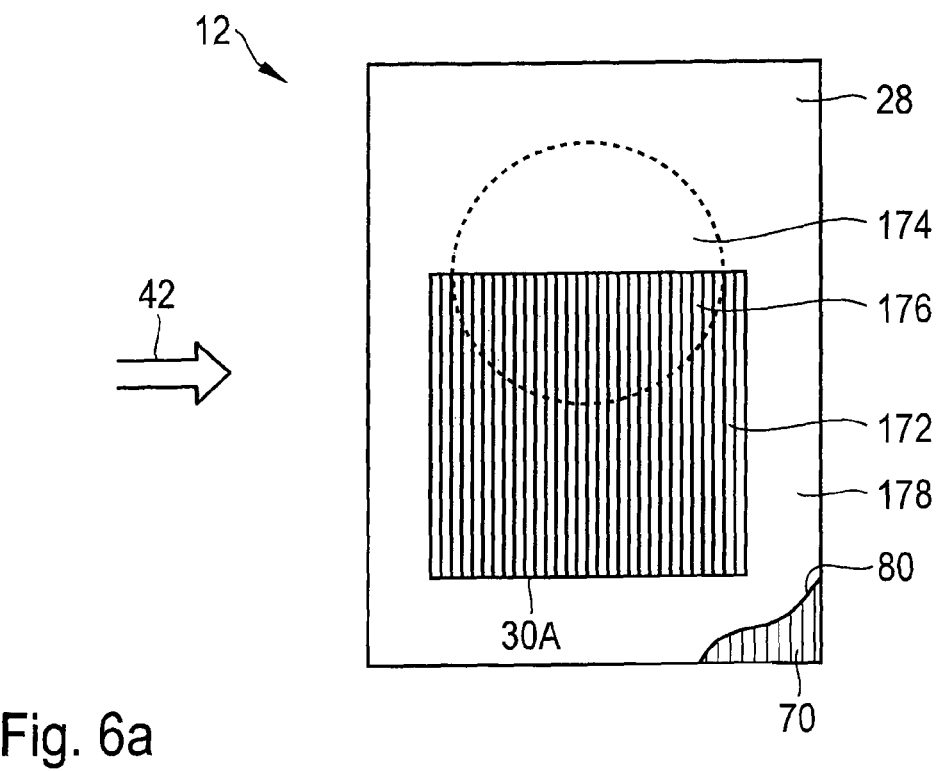
Figure 6B:
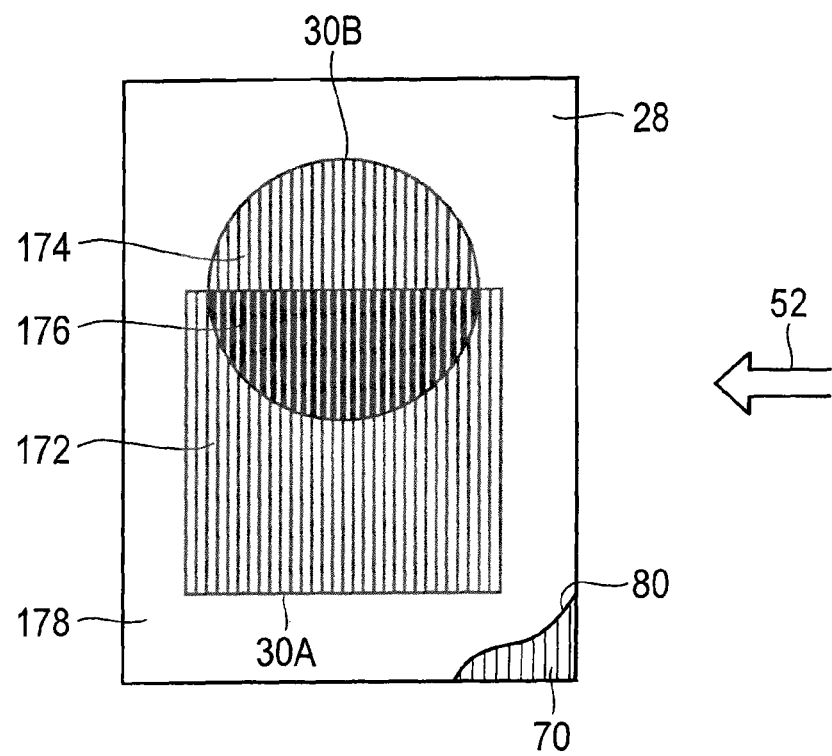

With reference to FIG. 6(*a*), the security element 12 is now first impinged on contiguously from the left with laser radiation 42. As explained above, here, in the lens grid sub-regions 72 and 76, which include rod lenses of type I and type II, respectively, local modifications 30A are produced in the congruently underlying motif layer sub-regions 172, 176 of the laser-sensitive motif layer 28.

In contrast, in the lens grid sub-regions 74 and 78, which include rod lenses of type III and type IV, respectively, no local modifications are produced in the congruently underlying motif layer sub-regions 174, 178 of the motif layer 28 despite the laser impingement since, there, the modification threshold of the motif layer 28 is not exceeded due to the beam-expanding effect of the lens segments 40A.

FIG. 6(*a*) shows a top view of only the motif layer 28 after said first step of laser impingement from the left. Additionally, in the region 80, the orientation of the rod lenses is again indicated in the lens grid 70 arranged over the motif layer 28.

Due to the form and arrangement of the rod lenses 40, 60 in the sub-regions 72 and 76, in the first step, line-shaped modifications 30A that, when subsequently viewed through the lens grid 70, produce the first appearance 14A of the square, were overlaid in the motif layer 28 precisely in the region of the square (motif layer sub-regions 172 and 176), as depicted in FIG. 1.

Thereafter, the security element 12 is impinged on contiguously from the right with laser radiation 52, as illustrated in FIG. 6(*b*). Here, in the lens grid sub-regions 74 and 76, which include rod lenses of type III and type II, respectively, local modifications 30B are produced in the congruently underlying motif layer sub-regions 174, 176 of the laser-sensitive motif layer 28. In contrast, in the lens grid sub-regions 72 and 78, which include rod lenses of type I and type IV, respectively, no local modifications are produced in the congruently underlying motif layer sub-regions 172, 178 of the laser-sensitive motif layer 28 despite the laser impingement since, there, the modification threshold of the motif layer 28 is not exceeded due to the beam expanding effect of the lens segments 40B.

FIG. 6(*b*) shows a top view of only the motif layer 28 after said second step of laser impingement from the right. Due to the form and arrangement of the rod lenses 62, 60 in the sub-regions 74 and 76, in the second step, line-shaped modifications 30B that, when subsequently viewed through the lens grid 70, produce the second appearance 14B of the circle, were overlaid in the motif layer 28 precisely in the region of the circle (motif layer sub-regions 174 and 176), as depicted in FIG. 1.

Since the motif layer sub-regions in which local modifications 30A, 30B are produced upon laser impingement from the left or from the right are determined completely by the form of the rod lenses 40, 60, 62, 64 in the lens grid 70, neither a mask nor a fine scanning of the motif layer is required for overlaying the desired markings. Rather, even complex tilt images can be overlaid in the motif layer 28 easily.

The two impingement steps described can, of course, also take place simultaneously, for example through suitable splitting of a laser beam or through the use of two laser sources. Even if the tilt image described in the exemplary embodiment switches between two representational depictions (square 14A and circle 14B), a tilt image can, in principle, also include only a single representational depiction that is visible from a certain viewing direction and not, in contrast, from other viewing directions.

Overall, the lens grid 70 of the exemplary embodiment is divided into four lens grid sub-regions 72, 74, 76, 78 in which the rod lenses 40, 60, 62, 64 each have differently refractive lens surface forms (fn, ff, of and nn, respectively), as illustrated in FIG. 4. The lens grid sub-regions 72, 74, 76, 78 are further congruent with the motif layer sub-regions 172, 174, 176, 178. As described, the markings 30A, 30B of the motif layer sub-regions are produced by laser impingement of the lens grid sub-regions.

While the principle of the present invention was explained above for a tilt image having two representational depictions, the lenticular images can also display only one or more than two representational depictions from different viewing directions. For example, the rod lenses for producing three (or four) different appearances can be divided into three (or four) lens segments that extend longitudinally, the lens surfaces of the lens segments in the different lens grid sub-regions each being developed to be, independently of each other, focusing or non-focusing.

However, for a larger number of appearances, a smaller proportion of the lens surface per appearance is available to be developed to be focusing or non-focusing. As a result, upon exposure, the light intensity in the focus decreases such that a lower optical contrast is produced and the respective other appearances can show through more pronouncedly. Also, as the number of appearances increases, the targeted setting of the laser intensity in the focal plane above or below the modification threshold becomes more difficult. Thus, in practice, normally lenticular images having only two, three or four appearances are used, with lenticular images having two appearances being preferred.

Beyond the lens forms described above, rod lenses can generally be divided into k lens segments, where k is preferably 2, 3 or 4. The lens segments are developed to be focusing or non-focusing according to the desired motif to be depicted. In focusing lens segments, the lenses can be spherical or also aspherical. The development of the microlenses as Fresnel lenses is also possible. Focusing regions of the different lens segments can each have the same focal point or also have two or more focal points that are offset from each other in the image plane. It is understood that, in rod lenses, the "focal point" is formed by a focus line along the longitudinal rod axis of the lenses. The name focal point refers here to a depiction of the lenses in cross section vertically to the rod axis.

Figure 7:
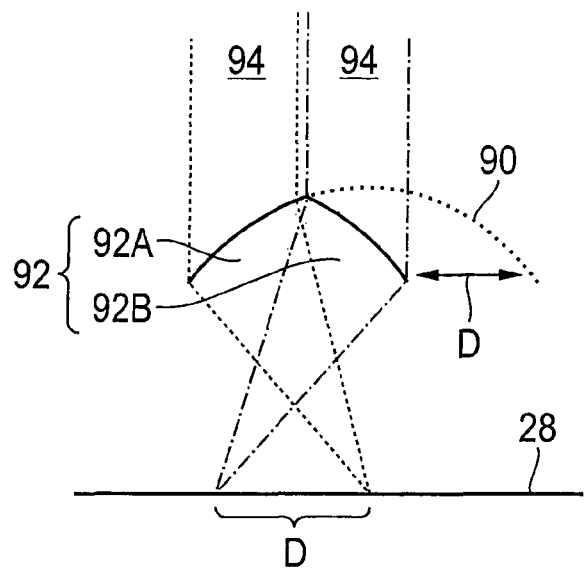

With reference to FIG. 7, an advantageous variant having different focal points of two lens segments can be obtained if a region of width D is taken out of the middle of a rod lens 90 having a spherical or aspherical cross section vertically to the rod axis. In this way, an acute lens 92 is created that, in its two lens segments 92A, 92B, focuses incident laser radiation 94 on two focal points that have a spacing D in the motif plane 28.

Analogously to the approach described above, such acute lenses 92 can be used in four forms (lens types I to IV having lens surfaces fn, ff, nf, nn) to produce lenticular images having two different appearances.

Figure 8:
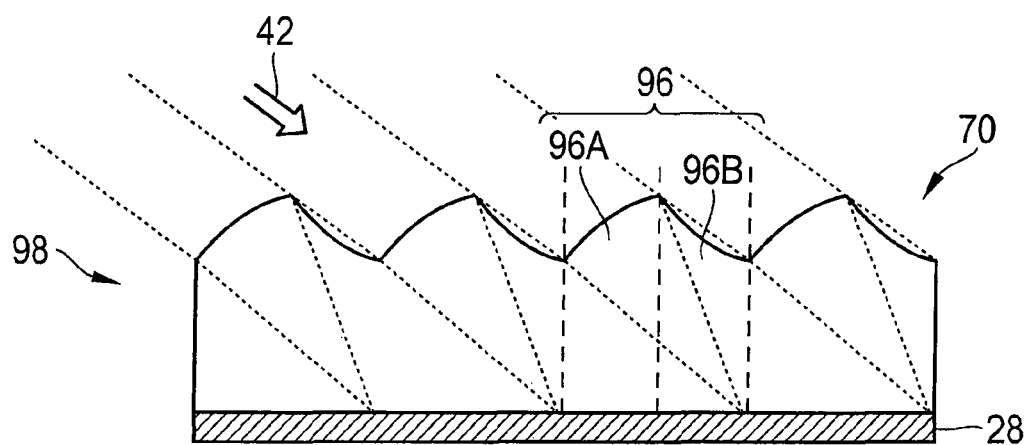

FIG. 8 shows a sub-region of a security element 98 having such a lenticular image in which, analogously to the depiction in FIG. 3, the lens grid 70 comprises rod lenses 96 having a left lens segment 96A developed to be focusing and a right lens segment 96B developed to be beam expanding. For a suitable choice of the viewing directions, with acute lenses 96, a particularly large portion of the incident laser radiation 42 can be directed to the focus on the motif layer 28. As is evident from FIG. 8, for a suitable coordination of spacing D and direction of incidence of the laser radiation, even the entire incident light can be directed to the focus. Accordingly, upon laser impingement on the beam-expanding lens segments 96B from the opposite side, practically the entire laser energy can be scattered and not focused on the motif layer 28. In this way, the setting of a laser power that is suitable for selective modification is simplified, and particularly high-contrast depictions can be produced.

In all designs, the non-focusing lens segments are preferably, in terms of absolute value, curved similarly or provided with local slopes identical to the focusing lens segments. Then only the sign of the radius of curvature (concave or convex lens surface) is different. Since a small proportion of incident light is also reflected by the lenses, different lens forms can become visible in reflection. Said effect can be minimized if the lens portions reflect incident light, to the greatest extent possible, in the same directions, which can be achieved by identical slopes and, at least in terms of absolute value, identical curvatures of the concave and convex lens segments. In other, simpler embodiments, the non-focusing regions can, for example, also be developed to be flat.

LIST OF REFERENCE SIGNS

10 Banknote
12 Security element
14A, 14B Appearances
16 Tilt direction
20 Security element
22 Substrate
24 Lens grid
25 Further layers
26 Rod lenses
28 Laser-sensitive motif layer
28A, 28B Right and left portion of a motif layer region
30 Markings
30A, 30B Local modifications
32A, 32B Laser beam
40 Rod lenses
40A, 40B Lens segments
42 Laser beam
44, 46 Portions of the laser beam
52 Laser beam
54, 56 Portions of the laser beam
60, 62, 64 Rod lenses
70 Lens grid
72, 74, 76, 78 Lens grid sub-regions
80 Region
90 Lens
92 Acute lens
92A, 92B Lens segments
94 Laser radiation
96 Rod lens
96A, 96B Lens segments
172, 174, 176, 178 Motif layer sub-regions

The invention claimed is:

1. A security element for securing security papers, value documents and other data carriers, comprising:
  a lenticular image that, from different viewing directions, displays at least two different appearances, the lenticular image including a lens grid composed of a plurality of microlenses and a laser-sensitive motif layer that is arranged spaced apart from the lens grid, the laser-sensitive motif layer comprising, in two or more motif layer sub-regions, different markings that are introduced by the action of laser radiation and that, when the motif layer is viewed with the lens grid, produce the at least two different appearances,
  wherein the microlenses are each divided into two or more lens segments,
  wherein the lens grid is divided into two or more lens grid sub-regions in which the microlenses each comprise differently refractive lens surface forms, the different lens grid sub-regions being congruent with the different motif layer sub-regions, and the markings of the motif layer sub-regions being produced by laser impingement of the lens grid sub-regions, wherein within a lens grid sub-region the lens surfaces of the two or more lens segments are developed to be identical for all of the microlenses, the lens surfaces of the lens segments each being developed, independently of the other lens segments, to be focusing or non-focusing in said lens grid sub-region, thereby forming the differently refractive lens surface forms, wherein there is at least one lens grid sub-region in which at least one lens segment is developed to be non-focusing.

2. The security element according to claim 1, wherein the lens grid is formed from a plurality of parallel rod lenses.

3. The security element according to claim 2, wherein the rod lenses are divided into two or more lens segments that extend longitudinally and in which the lens surfaces within a lens grid sub-region are developed to be identical but, independently of each other, focusing or non-focusing.

4. The security element according to claim 2, wherein the rod lenses are divided into exactly two, left and right, lens segments that extend longitudinally and in which the lens surfaces within a lens grid sub-region are developed to be identical but, independently of each other, focusing or non-focusing, and in that there is at least one lens grid sub-region in which the left lens segment of the rod lenses is developed to be focusing and the right lens segment of the rod lenses non-focusing, and there is at least one lens grid sub-region in which the left lens segment of the rod lenses is developed to be non-focusing and the right lens segment of the rod lenses focusing.

5. The security element according to claim 4, wherein there is at least one lens grid sub-region in which the left and the right lens segment of the rod lenses are developed to be focusing, and/or there is at least one lens grid sub-region in which the left and the right lens segment of the rod lenses are developed to be non-focusing.

6. The security element according to claim 2, wherein the rod lenses are divided into two or more lens segments that extend longitudinally and in which the lens surfaces within a lens grid sub-region are developed to be identical but, independently of each other, focusing or beam expanding.

7. The security element according to claim 2, wherein the rod lenses are divided into exactly two, left and right, lens segments that extend longitudinally and in which the lens surfaces within a lens grid sub-region are developed to be identical but, independently of each other, focusing or beam expanding, and in that there is at least one lens grid sub-region in which the left lens segment of the rod lenses is developed to be focusing and the right lens segment of the rod lenses non-focusing, and there is at least one lens grid sub-region in which the left lens segment of the rod lenses is developed to be non-focusing and the right lens segment of the rod lenses focusing.

8. The security element according to claim 1, wherein the lens surface is developed to be convex in the focusing lens segments and concave in the non-focusing segments.

9. The security element according to claim 8, wherein the radius of curvature in the focusing and the non-focusing segments is identical in terms of absolute value.

10. The data carrier according to claim 8, wherein the data carrier comprises one of a value document, security paper, identification card or branded article.

11. The security element according to claim 1, wherein, in the non-focusing segments, the lens surface is provided with a scattering superstructure that is formed by embossed roughnesses or irregularities, having dimensions of a few micrometers.

12. The security element according to claim 1, wherein the focal points of different focusing lens segments of the same microlenses are offset from each other in the motif plane.

13. A method for manufacturing a security element, having a lenticular image that, from different viewing directions, displays at least two different appearances, according to claim 1, the method comprising the steps of:

producing a lens grid comprising a plurality of microlenses divided into two or more lens grid sub-regions in which the microlenses are each produced having differently refractive lens surface forms;

arranging the lens grid spaced apart over a laser-sensitive motif layer, and impinging the lens grid on in each case in a large area with laser radiation from the specified different viewing directions to produce in the laser-sensitive motif layer two or more motif layer sub-regions that are congruent with the different lens grid sub-regions and that have different markings that are introduced by the action of laser radiation and that, when the motif layer is viewed with the lens grid, produce the at least two different appearances.

14. The method according to claim 13, further comprising the step of forming the lens grid from a plurality of parallel rod lenses, such that the rod lenses are each divided into two or more lens segments that extend longitudinally, and the lens surfaces of the lens segments within a lens grid sub-region are developed to be identical but, independently of each other, focusing or non-focusing.

15. The method according to claim 13, further comprising the step of forming the lens grid from a plurality of parallel rod lenses, such that the rod lenses are each divided into two or more lens segments that extend longitudinally, and the lens surfaces of the lens segments within a lens grid sub-region are developed to be identical but, independently of each other, focusing or beam expanding.

16. A data carrier having a security element according to claim 1.

17. A security element for securing security papers, value documents and other data carriers, comprising:

a lenticular image that, from different viewing directions, displays at least two different appearances, the lenticular image including a lens grid composed of a plurality of microlenses and a laser-sensitive motif layer that is arranged spaced apart from the lens grid, the laser-sensitive motif layer comprising, in two or more motif layer sub-regions, different markings that are introduced by the action of laser radiation and that, when the motif layer is viewed with the lens grid, produce the at least two different appearances, wherein the microlenses are each divided into two or more lens segments, wherein the lens grid is divided into two or more lens grid sub-regions in which the microlenses each comprise differently refractive lens surface forms, the different lens grid sub-regions being congruent with the different motif layer sub-regions, and the markings of the motif layer sub-regions being produced by laser impingement of the lens grid sub-regions, wherein within a lens grid sub-region the lens surfaces of the two or more lens segments are developed to be identical for all of the microlenses, the lens surfaces of the lens segments each being developed, independently of the other lens segments, to be focusing or non-focusing in said lens grid sub-region, thereby forming the differently refractive lens surface forms, wherein there is at least one lens grid sub-region in which at least one lens segment is developed to be non-focusing, and the lens surface is developed to be convex in the focusing lens segments and concave in the non-focusing segments.

* * * * *